June 25, 1968     J. J. TOBIN, JR     3,389,952
EXTERIOR MIRROR ASSEMBLY FOR VEHICLES
Filed Dec. 2, 1964
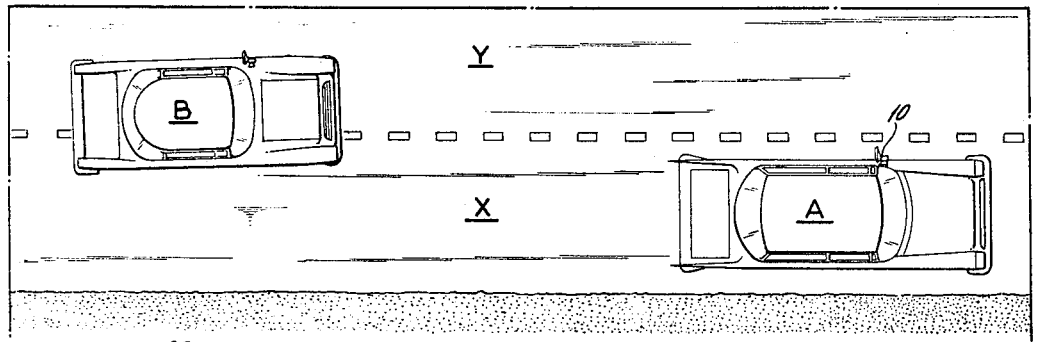
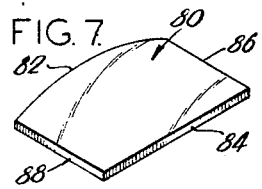
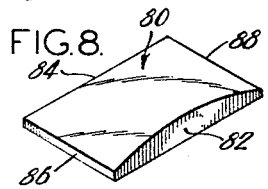
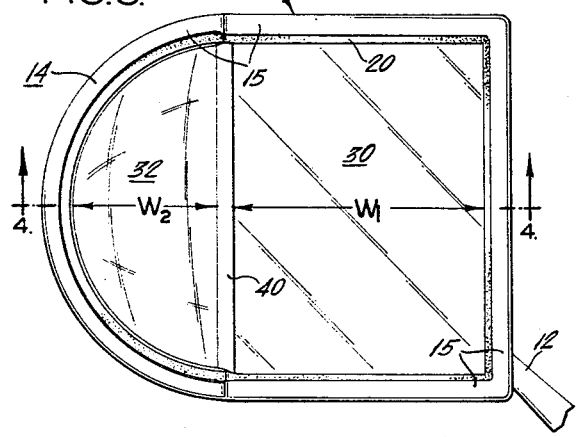
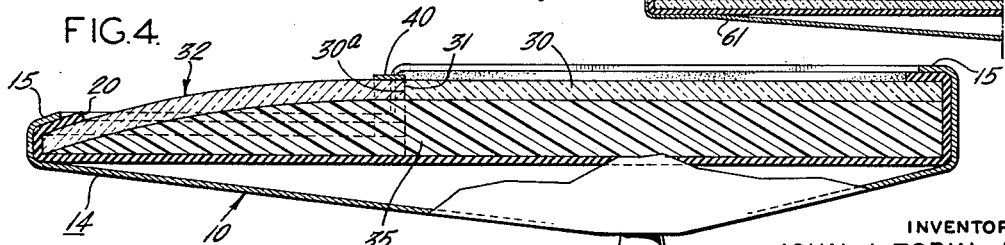
INVENTOR:
JOHN J. TOBIN, JR.
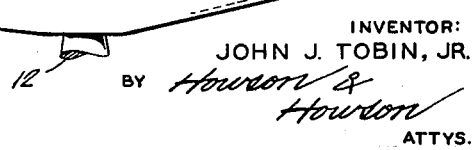
ATTYS.

United States Patent Office 3,389,952
Patented June 25, 1968

3,389,952
EXTERIOR MIRROR ASSEMBLY FOR VEHICLES
John J. Tobin, Jr., 113 Ardmore Ave.,
Ardmore, Pa. 19003
Filed Dec. 2, 1964, Ser. No. 415,438
4 Claims. (Cl. 350—303)

ABSTRACT OF THE DISCLOSURE

A rearview mirror assembly adapted to be mounted exteriorly of a vehicle relative to the driver so that he can observe trailing vehicles therein comprising a frame for supporting at least two mirror sections in a fixed position relative to one another, a first section having a planar reflecting surface and a second section having a convex reflecting surface not greater than one-half of a spherical segment disposed laterally adjacent the planar reflecting surface being arranged so that the straight side thereof is disposed adjacent one end of the first planar section outboard of the first section relative to the vehicle and indicia means at the juncture of the first and second sections. By this arrangement the image of trailing vehicles transfers from the planar surface of the first section to the convex surface of the second section when the trailing vehicles are disposed laterally and rearwardly adjacent the vehicle.

---

This invention relates to rearview mirrors for vehicles such as trucks, passenger cars and the like.

Rearview mirrors are customarily used on vehicles to provide the driver with a view of the traffic behind his vehicle and as an aid in making a safe judgement on whether to pass other vehicles on the road. Conventionally these mirrors which are mounted for example on the side of the vehicle to the driver's left have a flat, planar reflecting surface, and are selectively adjustable so that the driver has a clear view of traffic behind him. These flat, planar mirrors give a true image of trailing traffic. However, one of the major drawbacks of this type of mirror is that traffic behind the driver of a vehicle passes out of the range of the planar mirror when the trailing vehicles enter the so-called "blind spot." The "blind spot" is a zone starting parallel to the driver's vehicle and extending rearwardly to a short distance behind the driver's vehicle. Thus, if the driver relies solely on his rearview mirror to determine whether it is safe to pull out of his lane of traffic to pass a vehicle in front of him, there may be a vehicle in the "blind zone" which is not picked up by the mirror. Accordingly, the driver runs a great risk of collision if he relies solely on his rearview mirror when pulling out of his lane of traffic to pass another vehicle. This problem is especially critical with large vehicles such as trucks which have limited maneuverability and wherein the passing vehicles may be going at a much greater speed than the truck.

Curved or convex mirrors have been offered as a solution to this problem. However, the use of the curved or convex mirror presents other objections. For example, the convex mirror does not present a true image of the trailing vehicles, and thus it is difficult to judge the position of vehicles in the mirror in relation to the driver of a car or truck viewing the mirror. Additionally, the convex mirror picks up reflections from overhead lights and the like which are an annoyance to the driver.

The use of a flat mirror and a convex mirror superimposed on a portion of the flat mirror has been proposed. However, this arrangement has all of the undesirable features of the convex mirror by itself which have been enumerated above. Additionally, the combination mirror is confusing to the user for the reason that some of the trailing traffic appears simultaneously in both mirrors and it is difficult for the user of the combined mirrors to determine at a glance where trailing vehicles reflected in the mirrors are located with respect to his vehicle.

The present invention provides a mirror assembly for use on vehicles such as passenger cars, trucks and the like which overcomes the undesirable characteristics of mirrors heretofore used for this purpose and which permits the driver of a vehicle to have a clear, precise view of all traffic trailing his vehicle including vehicles in the blind zone. To this end the mirror of the present invention comprises a first section having a planar reflecting surface and a second section having a convex reflecting surface disposed to one side of the planar section. The convex section may be a portion of a spherical segment having a straight side edge adjacent and parallel to a lateral side edge of the planar section. A narrow indicia strip or band which may be a distinguishing color, for example red, is mounted at the intersection of the planar section and the convex section of the mirror. Preferably the mirror is disposed relative to the driver so that the convex section of the mirror is outboard of the planar section remote from the driver.

Considering now the use of the mirror assembly of the present invention, the driver adjusts the mirror so that he obtains a view of substantially all of the trailing traffic in the planar section as is normal, this view in the planar section excluding vehicles which are located in the blind spot. Now with the mirror set in this manner, vehicles trailing the driver's vehicle employing the mirror assembly are reflected as a true image on the planar section and as the trailing vehicles enter into the blind zone, the images move across the indicia strip into the convex section of the mirror. Thus, the driver knows immediately from a glance at the mirror assembly if there are any vehicles in the blind zone and also can see and determine the approximate location of vehicles which may be just entering the blind zone. Thus with the mirror of the present invention, the driver can make a safe judgement on whether to leave his lane of traffic for example, to make a turn or pass another vehicle. Further, since the convex section curves outwardly away from the driver, reflections from overhead lighting are directed away from the driver and do not present an annoyance to him.

With the foregoing in mind, an object of the present invention is to provide a new and improved rearview mirror assembly for vehicles such as passenger cars, trucks and the like which presents a completely clear view of traffic trailing the user's vehicle including those in the blind zone.

Another object of the present invention is to provide a rearview mirror for vehicles such as trucks, passenger cars and the like which is economical to manufacture and highly effective for the purposes intended.

A still further object of the present invention is to provide a convex mirror section having at least one straight side edge which may be readily applied to a portion of a planar mirror to provide a mirror assembly comprising a planar section and a convex section.

These and other objects of the present invention and the various features and details of the operation, construction and use thereof are hereinafter more fully set forth with reference to the accompanying drawings, wherein:

FIG. 1 is a plan view of a section of road showing a pair of vehicles employing rearview mirror assemblies constructed in accordance with the present invention;

FIG. 2 is an enlarged fragmentary perspective view of a mirror assembly in accordance with the present invention mounted on a vehicle;

FIG. 3 is a plan view of a mirror assembly constructed in accordance with the present invention;

FIG. 4 is an enlarged sectional view taken on lines 4—4 of FIG. 3;

FIG. 5 is a fragmentary view of a modified form of mirror in accordance with the present invention;

FIG. 6 is an enlarged sectional view taken on line 6—6 of FIG. 5; and

FIGS. 7 and 8 are perspective views of a convex mirror section of generally rectangular shape for use in a mirror assembly in accordance with the present invention.

Referring now to the drawing and particularly to FIG. 2 thereof, there is shown a mirror assembly 10 constructed in accordance with the present invention mounted on the side of a motor vehicle such as a passenger car or truck. The mirror assembly 10 is adapted to be mounted in a conventional manner to the automobile by means of a bracket 12 suitably secured to the automobile by conventional screws. The reflecting elements of the assembly are carried in a frame 14 made, for example, of a suitable metal which has a turned in peripheral flange 15 overlying the outer peripheral edges of the reflecting elements as illustrated. The frame 14 may be secured to the bracket 12 by means of a conventional ball and socket mounting arrangement to facilitate adjustment of the mirror assembly by the user. In the present instance, a liner 20 of resilient material, such as rubber may be interposed between the frame 14 and the reflecting elements to weather-proof the mirror.

In accordance with the present invention, the mirror assembly 10 is characterized by novel features of construction and arrangement whereby a clear and precise image of all of the traffic behind the driver, including that in the blind spot is readily visible. To this end the mirror comprises a planar section 30 which may be of rectangular shape and a convex section 32 to one side of the planar section 30. In the form of the invention illustrated in FIGS. 2–4 inclusive, the convex section is a portion of a spherical segment, preferably one-half of a spherical segment and the straight side 30a of the convex section 32 is coextensive with and abuts a side edge of the planar mirror section 30. The mounting arrangement is such that the peak of the convex section is flush with the front face 31 of the planar mirror 30. In order to support the mirror sections so that the peak of the convex mirror section 32 is flush with the front face of the planar section, the mirror sections may be backed with a support member or backer 35, for example, plastic mounted against the rear face of the mirror sections. As illustrated the liner 20 may also be adhered to the support 35. It is noted that the transverse dimension $W_1$ of the planar section 30 is preferably greater than the transverse dimension $W_2$ of the convex section.

A further feature of the present invention is the provision of an indicia strip 40 at the juncture of the planar section 30 and convex section 32 which indicia 40, in the present instance, is a strip of tape material adhered to the convex section and may be of a distinguishing color, for example, red. This indicia strip 40 serves as a visual means for the driver so that the traffic to the rear of the driver which is at a safe distance reflects as an image in the planar section to the right of the indicia strip 40 and the traffic behind the driver in the blind spot appears to the left of the indicia strip 40 in the convex section 32. Thus, if the driver notes that there are no vehicles in the convex section 32 then he knows that it is safe to pull out to his left into the lane, for example, to pass a vehicle in front of him.

Considering now the operation and use of the mirror, the mirror is usually positioned with the planar section 30 and the convex section 32 disposed in a plane approximately parallel to the ground with the convex section 32 outboard of the planar section 30 relative to the driver. The driver now adjusts the mirror so that the planar section 30 reflects the normal area behind the driver which would exclude the traffic in the so-called blind spot immediately parallel to the driver's vehicle and extending a short distance behind the back end of the vehicle.

It is noted that with the mirror positioned in this manner any vehicles in the blind spot are picked up as an image on the convex section of the mirror. Now, with reference to FIG. 1 and the vehicles marked A and B thereon, while vehicle B is in the lane X behind vehicle A, the image of vehicle B appears on the planar section 30 of the mirror on vehicle A. As vehicle B approaches vehicle A and starts to move into lane Y to pass vehicle A, the image of the vehicle B on the mirror of vehicle A gradually moves to the left in the planar section 30 and when the vehicle B enters into the blind zone or area, its image on the mirror of vehicle A gradually moves past the indicia strip 40 onto the convex section 32 of the mirror. Thus, the driver of vehicle A can tell at a glance that a vehicle is in the blind spot and it is not safe for him to move out of lane X.

There is shown in FIGS. 5 and 6 another form of mirror assembly 60a in accordance with the present invention. The assembly 60a comprises a conventional planar mirror 60 mounted in a suitable frame 61 and a convex mirror section 62 superimposed thereon. The convex section 62 may be provided with a suitable adhesive backing to secure it to the face of the planar mirror 60. The corner areas of the planar mirror 60 are preferably blanked out by means of a masking tape 63. As in the previously described mirror assembly, an indicia strip 66, an adhesive tape, is provided, which in the present instance is secured along the straight side edge 62a of the convex section 62. The convex section 62 is a portion of a spherical segment, preferably one-half of a spherical segment. Further the transverse dimension $D_1$ of the exposed portion of the planar mirror 60 is preferably greater than the transverse dimension $D_2$ of the convex section. The adjustment of the mirror assembly and the use thereof are identical to that described above.

Even though the convex section of the mirror assemblies discussed above is preferably not less than one-half of a spherical segment, sections less than a true one-half can be used. However in a mirror assembly wherein the convex section is less than one-half of a spherical segment there is a slight delay in the image transfer from the planar to the convex section. In these assemblies, the delay in image transfer can be eliminated by tilting the convex section toward the planar section.

In the illustrated forms of the invention, the vertical height of the planar section and the convex section are shown as being equal. However this need not be the case and if desired, the vertical height of the planar section may be greater than the height of the convex section so long as the sections are disposed relative to one another to provide for image transfer when a vehicle enters the blind zone.

Even though in the mirror assemblies discussed above, the convex section is a portion of a spherical segment and preferably one-half of a spherical segment, it is noted that convex sections of other than portions of a true spherical segment may be employed. For example, the convex section may be of the form illustrated in FIGS. 7 and 8. This convex section 80 is generally rectangular in form having a straight side edge 82 wherein the reflecting surface gradually curves to the lateral side edges 84, 86 and 88. This convex section 80 may be employed in a mirror assembly of the type illustrated in FIGS. 2–4 in lieu of the convex section 32 and in this assembly the straight side edge 82 is disposed adjacent to and parallel to a lateral side edge of the planar section. The convex section 80 may also be employed in mirror assemblies of the type illustrated in FIGS. 5 and 6 by superimposing the convex section 80 to cover a portion of the planar section.

While particular forms of the present invention have been illustrated and described herein, it is of course to be understood that changes and modifications may be made therein within the scope of the following claims.

I claim:
1. A rearview mirror assembly adapted to be mounted exteriorly of a vehicle relative to the driver so that he can observe trailing vehicles therein, a frame for supporting at least two mirror sections in a fixed position relative to one another, a first section having a planar reflecting surface and a second section having a spherical convex reflecting surface not greater than one-half of a spherical segment disposed laterally adjacent said planar reflecting surface and being arranged so that the straight side thereof is disposed adjacent one end of said first planar section outboard of the first section relative to the vehicle and indicia means at the juncture of said first and said second sections, whereby the image of trailing vehicles transfers from said planar surface of said first section to the convex surface of said second section when the trailing vehicles are disposed laterally and rearwardly adjacent the vehicle.

2. A rearview mirror assembly as claimed in claim 1 wherein the peak of the convex reflecting surface of said second section is disposed at the same plane as the planar reflecting surface of said first section.

3. A rearview mirror as claimed in claim 1 wherein the maximum transverse dimension of the planar reflecting surface of the first section is greater than the transverse dimension of said convex reflecting surface of said second section.

4. A rearview mirror assembly as claimed in claim 1 wherein said convex reflecting surface is equal to one-half of a spherical segment.

References Cited

UNITED STATES PATENTS

| 2,605,676 | 8/1952 | Couch | 350—303 |
| 2,890,539 | 6/1959 | Holt | 350—303 |
| 3,009,392 | 11/1961 | Snell | 350—303 |

JEWELL H. PEDERSEN, *Primary Examiner.*

W. L. SIKES, *Assistant Examiner.*